United States Patent

[11] 3,590,373

[72] Inventor John E. Lake
 Orlando, Fla.
[21] Appl. No. 833,277
[22] Filed June 16, 1969
[45] Patented June 29, 1971
[73] Assignee The United States of America as
 represented by the Secretary of the Army

[54] STRAY VOLTAGE AND CONTINUITY TEST DEVICE
 2 Claims, 8 Drawing Figs.
[52] U.S. Cl. ................................................. 324/73 R, 324/51
[51] Int. Cl. ................................................. G01v 15/12
[50] Field of Search ...................................... 324/73, 73 AT, 51

[56] References Cited
 UNITED STATES PATENTS
 1,949,634 3/1934 Simpson .................. 324/73 X
 2,950,437 8/1960 Stahl ........................ 324/51 X Primary Examiner—Edward E. Kubasiewicz
Attorneys—Alva H. Bandy, William G. Gapcynski, Lawrence A. Neureither, Leonard Flank, Jack W. Voigt and James T. Deaton ABSTRACT: A test device adapted for measuring AC voltage, DC voltage, and resistance in missile circuits without changing the interconnection between the missile circuits and the test device. The test device has a three pole reverse polarity switch in which the three poles have input terminals adapted for connection to the missile circuits to be measured. The reverse polarity switch has four throw contacts related with each pole where the four throw contacts are connected back to three poles of a four pole master select switch. The fourth pole of the master select switch is connected to the negative side of a current source in one leg of a limited current flow resistor bridge circuit, with the positive side of the current source connected to various fixed contacts related with the master select switch that are used in making resistance measurements. Each of the four poles of the master select switch has a wiper arm and 17 related fixed contacts for switching metering instrument connections through the reverse polarity switch and to circuits within a missile for measuring voltage and resistance therein.

John E. Lake,
INVENTOR

John E. Lake,
INVENTOR

John E. Lake,
INVENTOR

John E. Lake,
INVENTOR

BY Jack W. Voigt
James T. Deaton

STRAY VOLTAGE AND CONTINUITY TEST DEVICE

BACKGROUND OF THE INVENTION

In a missile under construction, or even after complete assembly, there is a need for a missile circuit test device that can test the circuits with test currents of less than 5.0 milliamperes, and without changing the connections between the device and the missile. Prior art test devices either exceed 5.0 milliamperes, have an inadequate resistance range of 0—30 ohms, or require connection changes between the test device and the missile circuit after each test is made.

SUMMARY OF THE INVENTION

This invention is a test device that measures AC and DC voltages. A small test current, compatible with the testing of missile ordnance circuits, is used to measure resistance in the missile circuits. The test device has a wide range of voltage and resistance testing capabilities and has a novel switching and circuit means for interconnecting appropriate measuring circuits between input terminals adapted for connection to missile circuits. The device is used for measuring AC voltages, DC voltages, and resistance of missile test circuits connected at the input terminals of the test device. The device is adapted for measurements of voltage and resistance within missile circuits where the measurements are made without changing the interconnection between the circuits and the input terminals of the test device.

DESCRIPTION OF THE PREFERRED EMBODIMENT

Figure 1:
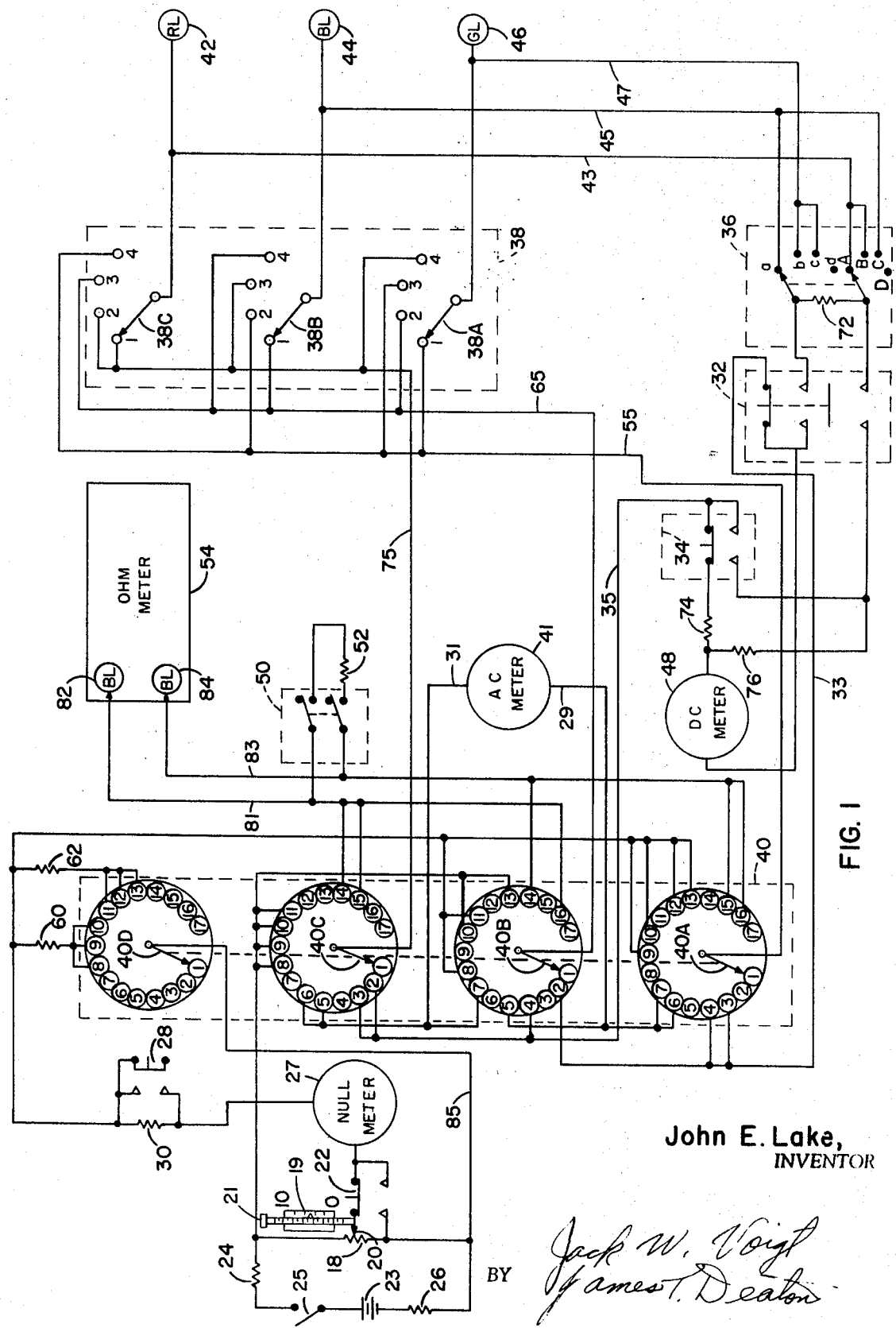
FIG. 1 is a schematic diagram of the test device showing novel switching and circuit means according to this invention.

Referring now to FIG. 1 for a description of the stray voltage and continuity test device, the apparatus contains mercury battery 23 and its related battery switch 25 in one leg of a limited current flow resistor bridge circuit. First and second bridge resistors 24 and 26 are connected in series with mercury battery 23 to form a current source in the one leg. The other leg of the bridge circuit contains vernier potentiometer 18. Wiper arm 20 of vernier potentiometer 18 is used to null bridge current and may be moved by an operator manually turning knob 21 until null meter 27 is nulled. Knob 21 moves wiper arm 20 and a pointer on vernier dial 19, simultaneously. Wiper arm 20 is electrically connected to a first terminal of spring loaded pushbutton infinity test switch 22 that is normally closed. A second terminal of test switch 22 is connected to a first terminal of null meter 27. A second terminal of null meter 27 is connected, through resistor 30 to various contacts on master select switch 40. The various contact connections are explained below. The normally open terminal of infinity test switch 22 is connected to the negative voltage side of vernier potentiometer 18. Master select switch 40 has four poles and 17 corresponding fixed contacts related with each pole. Each pole has a wiper arm ganged with all the other wiper arms and connected thereto for switching in electrical connection with the 17 fixed contacts. The 17 fixed contacts are numbers simply 1 through 17. The four poles are represented by 40A, 40B, 40C and 40D, and are indicated, in FIG. 1 at their respective wiper arms. The second terminal of null meter 27 is connected to contacts 9, 10, 12 and 13 related with pole 40A, to contacts 8 and 11 related with pole 40B, and through first voltage dropping resistor 60 to contacts 8, 9 and 10 related with pole 40D. The second terminal of null meter 27 is also connected through second voltage dropping resistor 62 to contacts 11, 12 and 13 related with pole 40D. Resistor 60 is typically a 100 kilo-ohm resistance while resistor 62 is a 1 kilo-ohm resistance. Mercury battery 23 is connected, through battery switch 25 and resistor 24, to contacts 8, 9, 10 and 11 related with pole 40C and contacts 10 and 13 related with pole 40B. Spring loaded pushbutton fine adjust switch 28 is connected across resistor 30. Fine adjust switch 28 is normally open and remains that way until null meter 27 is close to its zero indication, or null condition. An operator may close switch 28 when wiper arm 20 is moved over potentiometer 18 close to the null condition as indicated by null meter 27. The removal of resistor 30 from the circuit by closing fine adjust switch 28 adds greater sensitivity to the resistance measurement portion of the test device.

The test circuits, within the missile, to be measured for voltage and resistance are connected to input terminals 42, 44, and 46 of the stray voltage and continuity test set. Reverse polarity switch 38 has three poles with each pole connected to one of the input terminals and four corresponding fixed terminals related with each pole. The fixed terminals are number 1 through 4 and the three poles are represented by 38A, 38B, and 38C, and are indicated, in FIG. 1, at their respective wiper arms. Reverse polarity switch 38 is used for switching input terminals 42, 44, and 46 in various combinations within the test device.

Self test select switch 36 is a double pole four throw switch having fixed terminals $a$, $b$, $c$ and $d$ related with a first pole and corresponding fixed terminals A, B, C and D related with a second pole respectively, in which the wiper arms of the first and second poles are mechanically linked through a throw arm. Resistor 72 is connected between the first and second poles of switch 36 to prevent arcing during switching. Self test enable switch 32 is used to switch the first and second poles of self test select switch 36 across first and second terminals of DC voltmeter 48, respectively. Self test enable switch 32 is normally open across the first and second poles of self test select switch 36, and is normally closed between a first terminal of DC voltmeter 48 and lead 33. Lead 33 is connected to a junction of contacts 3 and 4 related with pole 40A and contact 2 related with pole 40B. Continuity tests are made on all the test device circuits by moving the wiper arms of the multiposition switches—the self test switch 36, reverse polarity switch 38, and the master select switch 40—in various positions and pressing enable switch 32 for each position. Spring loaded pushbutton voltmeter switch 34 is normally closed between lead 35 and a second terminal of DC voltmeter 48. Lead 35 is connected to contact 4 related with pole 40B and contacts 2 and 3 related with pole 40C. First voltage regulating resistor 74 is connected between voltmeter switch 34 and the second terminal of DV voltmeter 48. An operator may press voltmeter switch 34 and connect a second voltage regulating resistor 76 between lead 35 and the second terminal of voltmeter 48 for switching measuring scales of meter 48.

Contacts 1 and 17 related with each pole of master select switch 40 are "off" positions; contacts 2, 3 and 4 related with each pole of master select switch 40 are used for measuring DC voltage; contacts 5, 6 and 7 related with each pole of master select switch 40 are used for measuring AC voltage; contacts 8, 9 and 10 related with each pole of master select switch 40 are used in making high resistance measurements; contacts 11, 12 and 13 related with each pole of master select switch 40 are used in making medium range resistance measurements; and contacts 14, 15 and 16 related with each pole of master select switch 40 connect Alinco resistor bridge ohmmeter 54 to external circuitry for measuring low resistance values.

AC voltmeter 41 has a first terminal connected by lead 29 to contacts 6 and 7 related with pole 40A and to contact 5 related with pole 40B. A second terminal of AC voltmeter 41 is connected by lead 31 to contact 7 related with pole 40B and to contacts 5 and 6 related with pole 40C. Measuring terminal 82 of Alinco meter 54 is connected by lead 81 to a first pole of a double pole double throw ohmmeter switch 50, to contacts 14 and 15, related with pole 40C and to contact 16 related with pole 40B. Measuring terminal 84 of the Alinco resistor bridge ohmmeter 54 is connected by lead 83 to a second pole of ohmmeter switch 50, to contact 14 related with pole 40B and to contacts 15 and 16 related with pole 40A. The Alinco ohmmeter is a Model 101–5BF milliohmeter. Ohmmeter switch 50 is used to switch resistor 52 across leads 81 and 83. When resistor 52 is connected across leads 81 and 83, Alinco ohmmeter 54 will measure larger resistances. By connecting resistor 52 across leads 81 and 83, the range of Alinco ohmmeter 54 is increased from its normally maximum range measurement of 100 ohms up to 650 ohms. Pole 40A of master select switch 40 is connected by lead 55 to fixed terminals 1 and 3 related with pole 38A, to fixed terminal 2 related with pole 38B, and to fixed terminal 4 related with pole 38C. Pole 40B of switch 40 is connected by lead 65 to fixed terminal 2 related with pole 38A, to fixed terminals 1 and 4 related with pole 38B, and to fixed terminal 3 related with pole 38C. Pole 40C of switch 40 is connected by lead 75 to fixed terminal 4 related with pole 38A, to fixed terminal 3 related with pole 38B, and to fixed terminals 1 and 2 related with pole 38C. Pole 40D of switch 40 is connected by lead 85 to the negative side of mercury battery 23 through resistor 26.

Input terminals 42, 44 and 46, of the test device are adapted for connection to test circuits within a missile for voltage and resistance tests thereof. Input terminal 42 is connected directly to pole 38C and by lead 43 to fixed terminals A and B of self test select switch 36. Input terminal 44 is connected directly to pole 38B and by lead 45 to fixed terminals a and C of select switch 36. Input terminal 46 is connected directly to pole 38A and by lead 47 to throw terminals b and c of select switch 36. Fixed terminals d and D of select switch 36 are the "off" positions.

Before voltage and resistance tests are made, a self test check is performed on each circuit of the test device for determining if battery 23 is properly isolated from input terminals 42, 44 and 46 and to verify continuity in the various circuits of the test device. First, the operator manually turns knob 21, thus moving wiper arm 20 and a pointer along dial 19, until the pointer is moved to 9.90 on the dial setting. Wiper arm 20 will be on the positive voltage side of potentiometer 18 when the pointer is at 9.90 on the dial setting. Next, the wiper arms of master select switch 40 are set on contacts 8 for a high range resistance self test to determine if battery 23 is isolated from input terminals 42, 44 and 46 and to check continuity of the high range resistance test circuits. Select switch 36 is set with the wiper arms connected to fixed terminals a and A, and the wiper arms of reverse polarity switch 38 are set on terminals 1 for self test between input terminals 42 and 44. Sometime after battery switch 25 is closed, enable switch 32 is pressed. With enable switch 32 pressed, the voltage across the first and second poles of select switch 36 is applied across voltmeter 48. The first pole at position a of select switch 36 is applied to the first terminal of voltmeter 48, and the second pole at position A of select switch 36 is applied through resistor 76 to the second terminal of voltmeter 48. Voltmeter 48 will indicate if there is excessive voltage in the circuit of the test device. Enable switch 32 is then released. Even though this self test was across input terminals 42 and 44, select switch 36 can be switched to include a test across input terminals 42 and 46 or 44 and 46. Let it be understood that no external circuits are connected to input terminals 42, 44, and 46 at this time. The same process is repeated with master select switch 40 set on contacts 11 for a medium range resistance test.

For safety purposes, open the battery switch 25 before proceeding with tests using external loads between terminals 42, 44 and 46. Also, turn select switch 36 to fixed terminals d and D, and move the wiper arms of master select switch 40 to contacts 1. Set the pointer on vernier dial 19 to 0.00 before proceeding.

Figure 2:
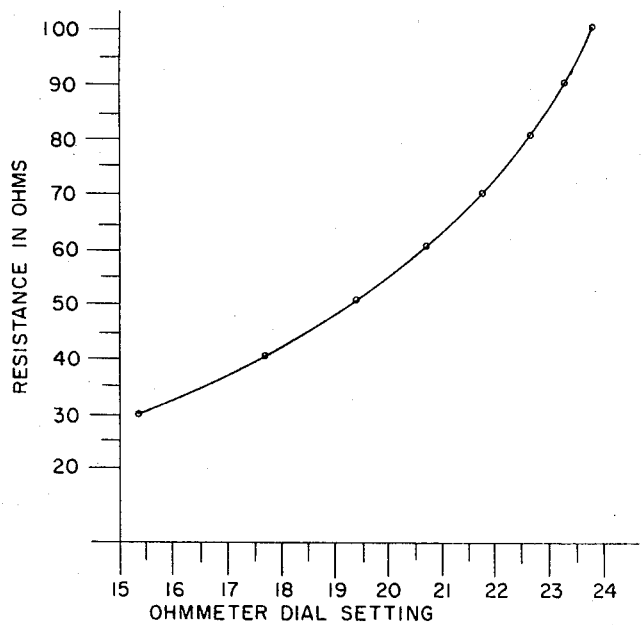
FIGS. 2 through 8 are interpolation curves.
Figure 3:
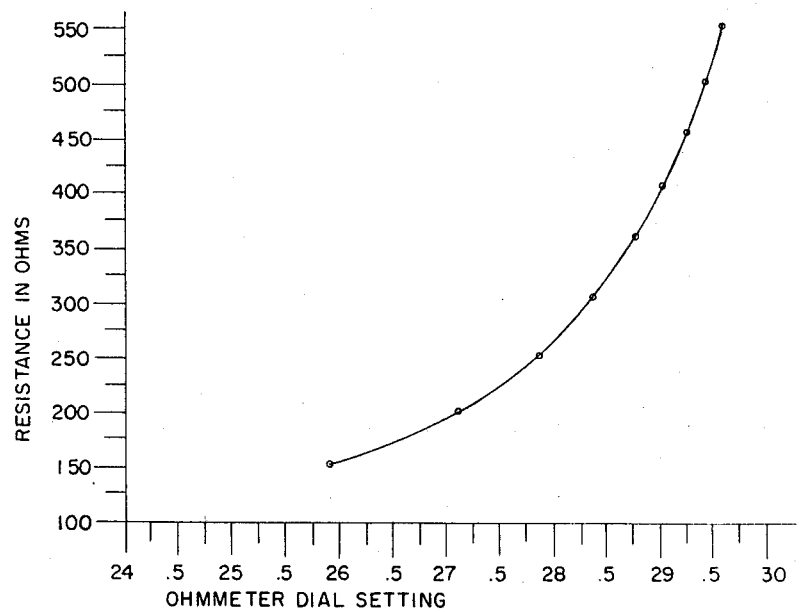

Interpolation curves, as shown in FIGS. 2 and 3, are prepared by using standard resistances from a fraction to 650 ohms connected between input terminals 42, 44 and 46. FIGS. 2 and 3 are associated with Alinco ohmmeter 54. Here is an example of how the curves of FIG. 2 are prepared. First, the wiper arms of master select switch 40 are turned to contacts 14, and the wiper arms of reverse polarity switch 38 are set on terminals 1. A select number of standard resistances between 30 to 100 ohms are then placed across input terminals 42 and 44, one at a time. Alinco ohmmeter 54 is nulled after each of the standard resistances are connected across input terminals 42 and 44. Alinco ohmmeter 54 has an indicator dial that works in conjunction with the nulling means and is positioned on a different setting of the indicator dial after each resistance measurement. Alinco meter indicator dial setting denotes a specific value of standard resistance each time the ohmmeter is nulled. Interpolation curves are prepared using standard resistances versus corresponding Alinco meter dial settings. FIG. 2 interpolation curves are prepared with ohmmeter switch 50 closed. FIG. 3 interpolation curves are also prepared with ohmmeter switch 50 closed, thus switching resistor 52 in the measuring circuit. Resistor 52 is connected across the Alinco ohmmeter and increases the meter range to 650 ohms. The interpolation curves are prepared in the same manner as before for FIG. 2.

Figure 4:
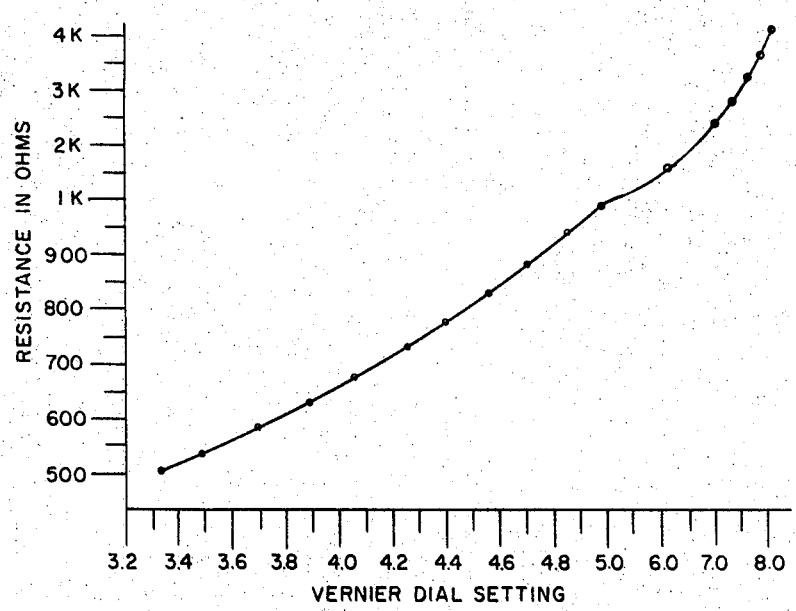
Figure 5:
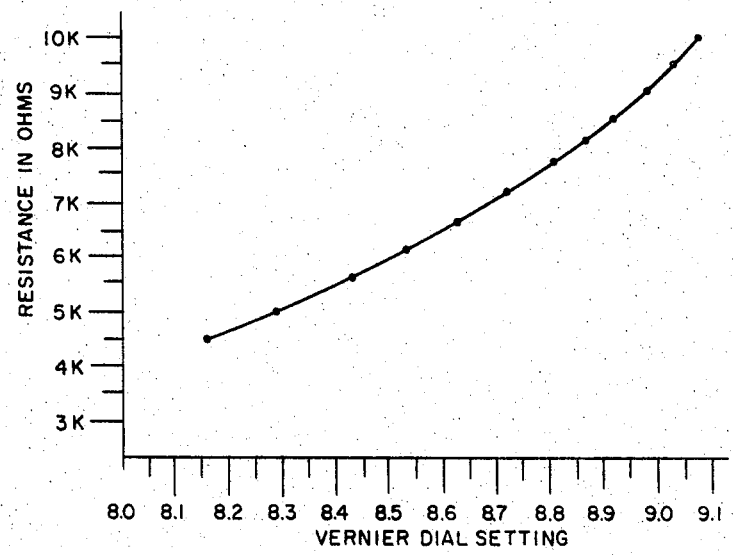

The interpolation curves of FIGS. 4 and 5 are for the medium range resistance measurements between 500 ohms and 10 kilo-ohms. To prepare these interpolation curves, first close battery switch 25 to furnish current from battery 23 to the bridge circuit. The bridge circuit consists of resistors 24 and 26, potentiometer 18 and the various standard resistances, between 500 ohms and 10 kilo-ohms, that are selectively connected at the input terminals. The wiper arms of master select switch 40 are positioned on contacts 11, and the wiper arms of reverse polarity switch 38 remain on terminals 1. Second voltage dropping resistor 62 forms a part of the bridge circuit when master select switch 40 is closed on contacts 11. Resistor 62 has a resistance of 1 kilo-ohm. A select number of standard resistances between 500 ohms and 10 kilo-ohms are placed across input terminals 42 and 44, one at a time. Null meter 27 is nulled each time a standard resistance is connected across input terminals 42 and 44 by an operator moving wiper arm 20 and by knob 21. Fine adjust switch 28 is pressed by the operator when null meter 27 is near the null point. By pressing switch 28, resistor 30 is taken out of circuit, causing null meter 27 to be more sensitive. The voltage on wiper arm 20 is zero when null meter 27 is nulled. Switch 28 is released after null meter 27 is nulled. Interpolation curves of FIGS. 4 and 5 are prepared by comparing each of the standard resistances with the corresponding reading on vernier dial 19 when meter 27 is nulled.

Figure 6:
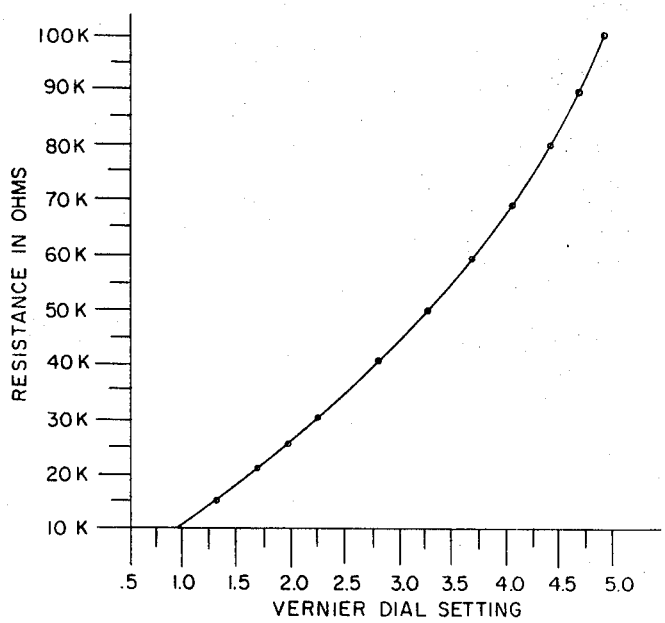
Figure 7:
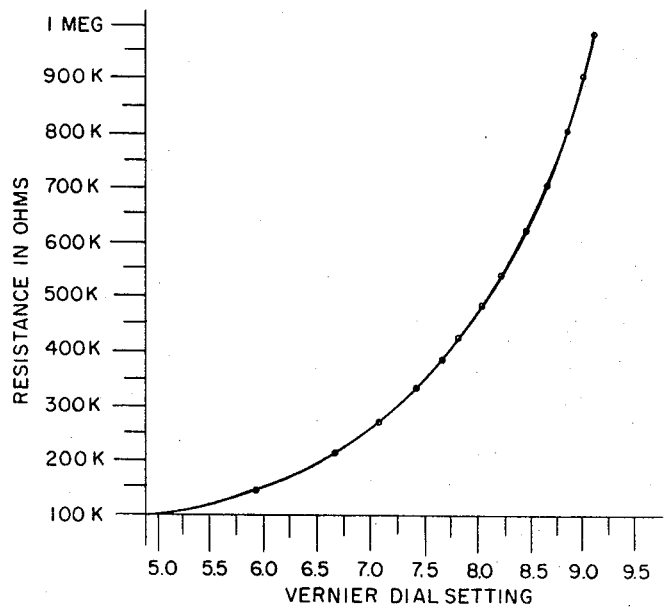
Figure 8:
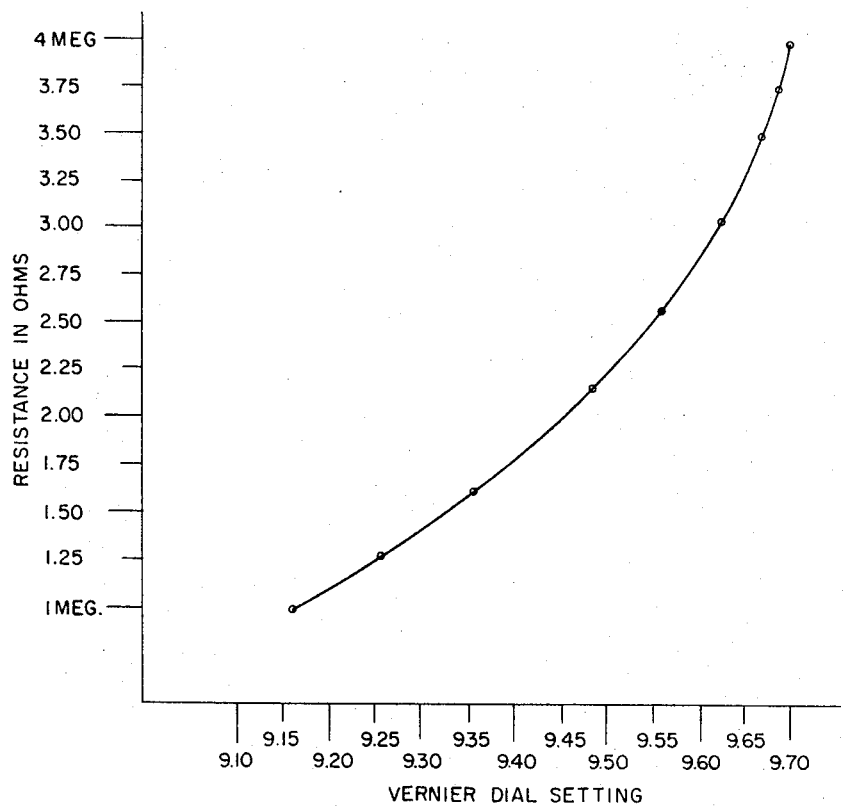

The interpolation curves on FIGS. 6, 7 and 8 are prepared by using standard resistances between 10 kilo-ohms and 4 meg-ohms connected to the input terminals, one at a time. This value of resistance is classified as high resistance in the language of this invention. As before, close battery switch 25 to furnish current from battery 23 to the bridge circuit that consists of resistors 24 and 26, potentiometer 18, and the standard resistances, between 10 kilo-ohms and 4 meg-ohms, that are selectively connected at input terminals 42 and 44. The wiper arms of master select switch 40 are turned to contacts 8, and the wiper arms of reverse polarity switch 38 remain on terminals 1. The first voltage dropping resistor 60 forms a part of the bridge network with master select switch 40 closed on contacts 8. Resistor 60 has a resistance of 100 kilo-ohms. Null meter 27 is nulled as explained above each time a standard resistance between the valve of 10 kilo-ohms to 4 meg-ohms is placed across input terminals 42 and 44. The interpolation curves of FIGS. 6, 7 and 8 are plotted by using the valve on vernier dial 19 versus each standard resistance when each of the standard resistances are nulled.

An example of measuring a 10 kilo-ohm to 4 meg-ohm resistance valves in external circuitry connected between input terminals 42 and 44 is as follows. First, close battery switch 25 and then set the wiper arms of reverse polarity switch 38 to terminals 1. Set the wiper arms of master select switch 40 on contacts 8, thus connecting resistor 60 in the bridge circuit. Next, rotate knob 21 to move wiper arm 20 over potentiometer 18 and the pointer over vernier dial 19. The input to null meter 27, through switch 22, will approach a zero indication on null meter 27. When null meter 27 approaches the zero indication, an operator may press and hold fine adjust pushbutton switch 28, thus bypassing resistor 30, making null meter 27 more sensitive. Continue rotating knob 21 slowly until null meter 27 has a zero indication. Switch 28 may then be released. Refer now to the appropriate curve of the interpolation curves in FIGS. 6, 7 or 8 and compare the reading on vernier dial 19 versus the resistance indicated at the same vernier dial 19 reading when the curves were prepared. The value of external circuitry resistance across input terminals 42 and 44 is taken directly off the interpolation curves.

If the resistance of external circuitry between input terminals 42 and 44 is thought to be from 500 ohms to 10 kiloohms, master select switch 40 is set on contacts 11. With master select switch 40 set on contacts 11, the much smaller resistor 62 replaces resistor 60 in the bridge circuit. Interpolation curves on either FIGS. 4 or 5 are used to indicate the resistance of the external circuitry after the wiper arm 20 has zeroed null meter 27 in the same manner as indicated above.

As stated above, if resistance measurements between any two of the input terminals 42, 44 and 46 are need that are less than 500 ohms, Alinco resistor bridge ohmmeter 54 is used. An example of such a circuit having a small resistance is a rocket squib circuit. Ohmmeter switch 50 switches resistor 52 across measuring terminals 82 and 84 of Alinco resistor bridge ohmmeter 54 when a measurement of resistance between 30 and 500 is needed. Under test conditions, the Alinco meter range is 0.01 to 29.99 ohms with ohmmeter switch 50 opened and 30 to 500 ohms with switch 50 closed. When measuring test circuit resistance of a value less than 30 ohms connected between input terminals 42 and 44 by using the Alinco meter, first set the wiper arms of master select switch 40 on contacts 14 and the wiper arms of reverse polarity switch 38 on terminal 1. Next, null Alinco ohmmeter 54 and compare the Alinco dial indicator setting with the corresponding value of standard resistance from FIG. 2. If the resistance to be measured is suspected of being over 30 ohms, the ohmmeter switch 50 is closed, connecting resistor 52 across measuring terminals 82 and 84 of Alinco ohmmeter 54. Again, null Alinco ohmmeter 54 and compare the Alinco dial indicator setting with the corresponding value of standard resistance from FIG. 3.

If the operator desired to measure the resistance of the external circuit in reverse polarity between terminals 42 and 44, turn reverse polarity switch to positions 3 and go through Alinco meter nulling process and interpolation curve preparation again. Other reverse polarities are measured in a similar manner.

The test device is also used to measure for static charge or stray voltage within the circuitry of the missile when the missile is being assembled, since voltages tend to build across circuits during missile assembly. A typical check for stray voltage is as follows. First, turn select switch 36 to positions d and D, or the "off" position. Set the wiper arms of reverse polarity switch 38 to terminals 1, and connect input terminal 46 to a missile single point ground. Set the wiper arms of master select switch 40 to contacts 1. Connect input terminals 42 and 44 to the circuit under test for stray voltage. Now, turn the wiper arms of master select switch 40 to contacts 2. Voltmeter 48 will be connected to one side of the circuit under test at input terminal 42 by way of voltmeter switch 34, lead 35, contact 2 and wiper arm related with pole 40C, lead 75, terminal 1 and wiper arm related with pole 38C and on to input terminal 42. The other side of voltmeter 48 will be connected to input terminal 44, and thus across the circuit under test, by way of self test enable switch 32, lead 33, contact 2 and wiper arm related with pole 40B, lead 65, terminal 1 and wiper arm related with pole 38B and to input terminal 44. If there is no voltage indication on the DC voltmeter 48 with this circuit connection, press and hold voltmeter switch 34 to see if there is a millivolt value of DC voltage in the above traced circuit. Release voltmeter switch 34 and turn the wiper arms of master select switch 40 to contacts 3 and repeat the above procedure with voltmeter switch 34 to see if a millivolt value of DC voltage is present across terminals 42 and 46. The wiper arms of master select switch 40 are turned to contacts 4 and the same procedure repeated with voltmeter switch 34 to see if a millivolt value of DC voltage is present across terminals 44 and 46.

The wiper arms of master select switch 40 are turned to contacts 5 for connecting the circuit at terminals 42 and 44 across AC voltmeter 41 and verifying the value of AC voltage thereon. By turning the wiper arms of master select switch 40 to contacts 6, the AC voltage in the circuit connected at terminals 42 and 46 is connected across AC voltmeter 41. Also, by turning the wiper arms of master select switch 40 to contacts 7, the circuit connected at terminals 44 and 46 are connected across AC voltmeter 41. Thus, the master select switch is used to switch the various input terminals 42, 44 and 46 without having to disconnect the input terminals connected to external circuitry.

The stray voltage and continuity test device should be calibrated occasionally by inserting standard resistance at terminals 42, 44 and 46 and new interpolation curves prepared.

I claim:

1. A stray voltage and continuity test device comprising: voltage measuring means including a DC voltmeter and an AC voltmeter; a first resistance measuring means; a second resistance measuring means; switching means comprising a master select switch, said master select switch consisting of four poles wherein each of said four poles has 17 fixed contacts related with their respective pole, each pole having a wiper arm connected thereto whereby all four wiper arms are mechanically ganged together in such a manner that all four wiper arms are in contact with respective numbered contacts of said 17 fixed contacts, said first resistance measuring means comprising a limited current flow resistor bridge circuit having two legs with a mercury battery and two resistors in one leg for providing a current source and a current regulating means in the other leg of said resistor bridge circuit, said current regulating means comprising a potentiometer having a wiper arm and vernier dial wherein said wiper arm and a pointer on said vernier dial are manually movable by a knob connected thereto and a null meter having first and second terminals wherein said first terminal is connected to said wiper arm and said second terminal is connected to said master select switch, said second resistance measuring means comprising a resistor bridge ohmmeter with its measuring terminals connected to said master select switch, said seventeen fixed contacts being so connected to said voltage and resistance measuring means that by switching said wiper arms thereon measurement of electrical values of said external circuits across said input terminals can be made without changing connections of said input terminals.

2. A stray voltage and continuity test device as set forth in claim 1 wherein said switching means further comprises a reverse polarity switch, said reverse polarity switch having there poles, each of said poles being connected to one of said plurality of said input terminals and each of said three poles has four fixed terminals related to their respective pole, each pole having a wiper arm connected thereto whereby all three wiper arms are mechanically ganged together in such a manner that all three wiper arms are in contact with their respective numbered terminals of said four fixed terminals, said four fixed terminals being connected to three poles of said master select switch in such a manner that said voltage and resistance measuring means may be connected to external circuits across said input terminals in reverse polarity for reverse polarity measurements by switching said reverse polarity switch and said master select switch simultaneously.